Oct. 20, 1959     J. R. STEEGSTRA     2,909,403
INKLESS ELECTRIC RECORDER FOR INDICATING INSTRUMENTS
Filed Feb. 28, 1956
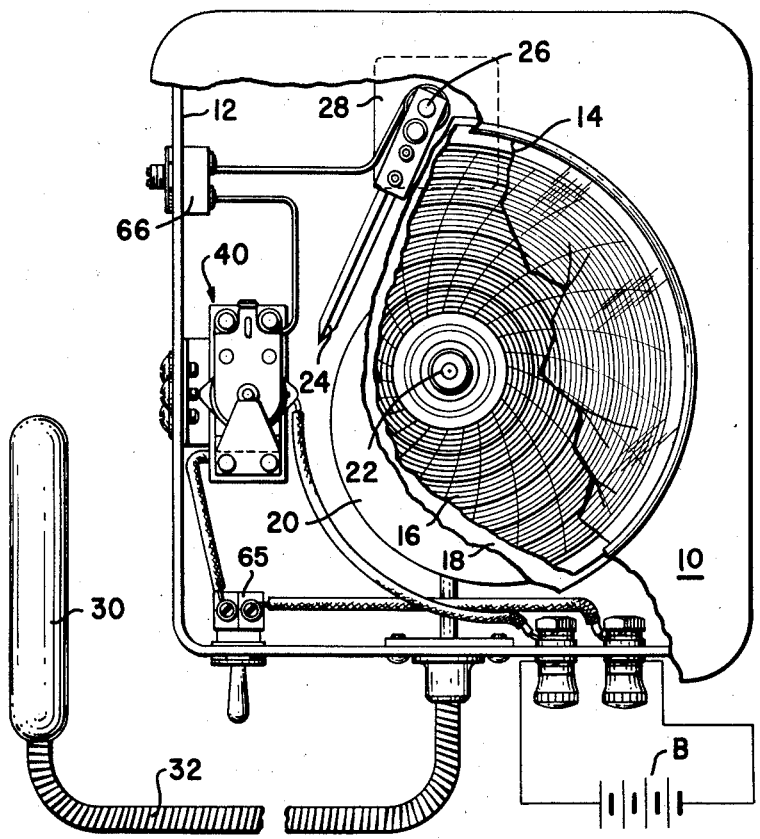
*Fig. 1*
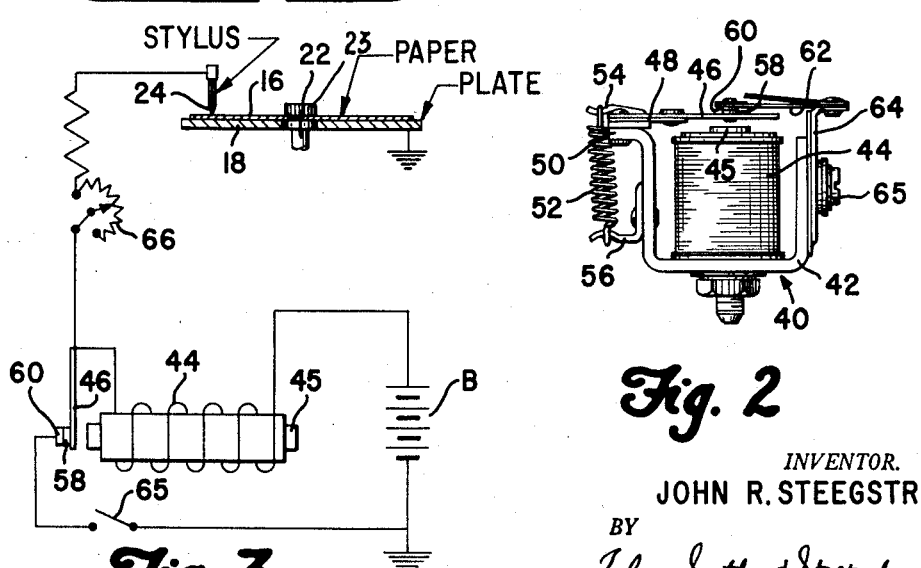
*Fig. 2*
*Fig. 3*
INVENTOR.
JOHN R. STEEGSTRA
BY
Falvey, Souther & Stoltenberg
ATTORNEYS ts Patent Office  2,909,403
Patented Oct. 20, 1959

2,909,403

INKLESS ELECTRIC RECORDER FOR INDICATING INSTRUMENTS

John R. Steegstra, Toledo, Ohio

Application February 28, 1956, Serial No. 568,351

3 Claims. (Cl. 346—74)

This invention relates to inkless electric markers for recorders, more particularly to a voltage-boosting mechanism which cooperates with a recording stylus to create a colored line by initiating a chemical change through the action of an electric current in a suitably treated graph paper.

In the past, recording instruments such as thermometers, pressure indicators, and the like have used graph markers which utilized inking devices, which are generally unsatisfactory as being not too reliable and required a great deal of attention for their operation. The present invention contemplates the provision of an electric means which fulfills this same function and is operable at very low voltages such as is obtained from small dry cells to mark a graph paper by providing the recording line thereon created by a chemical reaction initiated by an electric current on the graph paper which has been given a suitable preliminary treatment such as is disclosed in Patents Nos. 2,251,742, 2,346,670, and others.

The invention further contemplates the provision of a voltage booster which utilizes the inductive kick of an inductive circuit opened by a vibratory device, so that a low-voltage, low-energy electrical source may be used in connection with an electrical marking device, such as the electrical energy derived from small dry cells.

It is, therefore, a principal object of this invention to provide an electrical marker for use with recording devices using specially treated graph papers which may be operated by the energy derived from portable sources of electrical energy having a low voltage.

It is a further object of this invention to provide a voltage-boosting device, which operates on a low voltage to give relatively high voltage surges derived from the opening of an inductive circuit by a vibratory device, to be used in connection with a marking mechanism of a recording device wherein specially treated graph paper is used.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is an elevational view, partly in section, of a recording instrument to which the invention has been applied;

Fig. 2 is an elevational view of a part; and

Fig. 3 is a schematic diagram of connections.

Referring to the drawings, particularly to Fig. 1, a recording instrument 10 is shown mounted in a suitable case 12, which may be sealed, if desired, and fitted with a clear glass front plate 14 to make visible a rotating indicator sheet 16 suitably mounted for rotation above a fixed plate 18 of conducting material, such as steel or brass. The sheet 16 is rotated at a suitable speed in a clockwise direction by a clockwork 20 through shaft 22 to which it is affixed in any convenient manner as by nut 23. The indicator sheet 16 cooperates with a recording stylus 24, pivotally mounted on a rotatable shaft 26 adjacent the perimeter of the sheet to lightly and resiliently touch the sheet at a point under a suitable spring bias to make an indicating line thereon as will be further described hereinafter.

The shaft 26, which mounted the stylus 24, is rotated by an indicating mechanism 28, which is responsive to changes in a primary physical effect, such as pressure or temperature or the like, by having a bulb 30, or similar device, in contact therewith to respond to the effect. The bulb is connected with the indicating mechanism by a capillary tube 32 or the like. It is to be understood that this aspect of the device may vary widely and may be electrical or mechanical in its force effects as long as the stylus 24 is actuated in response to changes in the physical effect being measured and indicated. The indicating mechanism 28 driving the stylus is affixed in a suitable position in the casing 10, in a manner, so that it is insulated therefrom electrically, so that an electrical potential may be applied to the stylus to cause a current to flow through the chart 16 to the plate 18. If desired, the stylus may be insulated from the shaft 26, so that the electrical potential will be applied only to the stylus which is made of conducting material.

In the past, the indicating means provided to cooperate with the stylus to leave a marking line on the graph 16 has been an inking device which proved to be very difficult to maintain in suitable operating condition. Furthermore, the inking devices positioned on the stylus were relatively heavy and required a relatively heavy pressure at the point of contact with the graph paper to leave an indicating line which often was a very heavy line. This required an indicating instrument which developed considerable torque to overcome this resistance created by the friction between the stylus and the graph. In the present invention, the use of an electric current of relatively high instantaneous voltage to create the line on the graph at the point of its cooperation with the stylus does not involve heavy friction. Light contact pressure is desirable at the point where the stylus bears on the graph.

The graph 16 is a specially prepared paper printed on its forward face with ink to indicate the time relation of rotation relative to the indicator means 28 as established by the speed of rotation of the shaft 22 by the clockwork 20. These graph lines are capable of being varied widely and are so well known in the art that no further description of them is necessary. The graph 16 is made of paper which has conducting properties which are created by suitable chemical treatments. The chemicals deposited have the property of discoloring when an electric current of a suitable potential is passed through the paper. The trade name applied to papers of this type in commerce is "Teledeltos" and the paper is believed to be prepared in accordance with the teachings of one or more of the following patents: 2,181,533, 2,229,091, 2,283,558, 2,294,146, 2,294,149, 2,346,670, 2,251,742, 2,528,005. This paper is formed and cut to a suitable dimension, so that it is capable of being affixed to the rotatable shaft 22, which moves the paper in front of the plate 18 made of conducting material, preferably metals. When an electrical potential of suitable voltage, preferably over 90 volts, is applied across the paper by the stylus and the supporting plate, a current flows through the paper and leaves a dark line thereon as the paper is moved in timed relation under the stylus. As the stylus is moved by the indicating means, this line makes a permanent record of the variations of the primary physical effect on the graph paper 16. After the selected time interval has passed, a new clean graph paper 16 is again affixed to the shaft 22 after the removal of the previous graph paper which carries the record of the previous time interval.

In order to obtain the necessary potential of above 90 volts desirable to discolor the graph 16, a novel voltage-boosting device has been provided which utilizes the "inductive kick" when a circuit is opened through an inductive load. This "inductive kick" has a substantially higher voltage than that of the power source utilized which boosts the voltage to the relatively high values required to discolor the graph paper 16. To accomplish this result, a vibrator 40 is provided, which is suitably mounted on the inside of the casing 10, as shown in Fig. 1. The vibrator consists of a U-shaped magnetic field member 42, in the bight of which a coil 44 wound on an iron core 45 is mounted to attract a magnetic armature 46 resiliently, preferably mounted on a bimetallic spring member 48 affixed at its distal end to an outwardly-extending ear 50 on the frame or field member 42. The bimetallic spring is so arranged that it compensates the magnetic circuit and the electrical circuits for variations in ambient temperatures. The armature is provided with a spring bias by spring 52 which is looped on an ear 54 of the armature and is anchored at its lower end to the frame member 42 by a bendable ear 56 affixed thereto in any convenient manner. The ear 56 may be bent manually to change the spring bias to a desirable value. The armature is also provided with a contact point 58, which cooperates with a second contact point 60 affixed to a resilient spring member 62 affixed at its distal end to an adjustable bracket 64 slidably attached by screw 65 to the frame member.

The elements of the vibratory means are connected in an electrical circuit, as shown in Fig. 3, wherein the battery B, preferably consisting of four small dry cells having a voltage of 6 volts, is connected on one side to ground and the other side to one end of the coil 44 having its magnetic core 45 so as to act as a solenoid. The other side of the coil is connected to the movable contact 58 on the armature, which breaks the circuit when moved away from the relatively fixed contact point 60. The relatively fixed contact point may then be grounded or connected by a return wire to a manual switch 65 and thence to the grounded side of the battery B as shown. The relatively movable contact point 58 is also connected through a variable resistance 66 directly to the stylus 24. The metallic plate 18 is grounded, so that the "inductive kick" of the coil 44 is applied directly to the stylus 24 to provide the potential to discolor the graph paper 16 as already described.

In this way, a small portable source of potential of 6 volts provides the relatively high voltage required to discolor the "Teledeltos" paper, boosted by the "inductive kick" in the vibratory circuit through the inductance coil 44. The circuit provides this voltage at intermittent times in accordance with the vibrations of the armature which, as it vibrates, opens and closes the contacts 58 and 60 to create a series of high voltage pulsations, which pass through the graph paper 16 from the point of the stylus 24 to the grounded plate 18.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In an indicating device, means to move a chemically treated paper chart in touching relation between a fixed conducting plate and a movable conducting stylus controlled by a means responsive to a physical effect to be indicated on the chart, said indication consisting of a chemical discoloration of the paper of the chart created by an electric current flowing through the chart from the stylus to the conducting plate, and an electric circuit means to cause said current to flow through said chart including a first electric circuit consisting of the conducting plate, the stylus, a variable resistance, an inductive coil, and a low voltage source of electrical energy, and a second energizing electric circuit in parallel with the first electric circuit including the inductive coil, the source of electrical energy and a pair of vibratory contacts actuated by the magnetic field created by the coil when energized from the battery to open the energizing electric circuit through the coil, the two circuits being so arranged that the first circuit is subjected to a high voltage peak created by the self-induced current of the coil when the second energizing circuit of the coil is broken by the vibratory means.

2. In an indicating device for a permanent recorder, a casing, means mounted in the casing for moving a chemically-treated paper chart in touching relation between a fixed conducting plate and a movable conducting stylus controlled by a means mounted in the casing responsive to a physical effect whose condition is to be indicated on the chart, vibratory means mounted in the casing including an inductance coil in circuit with a low-voltage battery and contact points which are adapted to be opened by the magnetic field of the coil when energized by the battery, said stylus and plate being in electrical circuit with the coil and the battery so that the chart positioned between them is subjected to the self-induced voltage peak of the coil when its energizing circuit with the battery is broken by the vibratory means whereby the chart is discolored at its point of contact with the stylus, and a variable resistance mounted in the casing connected in the circuit with the stylus and the coil to control the voltage peak.

3. In an indicating device, means to move a chemically treated paper chart in touching relation between a fixed conducting plate and a movable conducting stylus controlled by a means responsive to a physical effect to be indicated on the chart, said indication consisting of a chemical discoloration of the paper of the chart created by an electric current flowing through the chart between the stylus and the conducting plate, and an electric circuit means to cause said current to flow through said chart, including a first electric circuit consisting of at least the conducting plate, the stylus, and a source of voltage peaks, and a second energizing circuit cooperating with the first electric circuit and a source of low-voltage electrical energy, the two circuits being so arranged that the first circuit is subjected to a high voltage peak created by the source when the second cooperating electric circuit is intermittently energized by the source of electrical energy.

References Cited in the file of this patent

UNITED STATES PATENTS

| | | |
|---|---|---|
| 910,956 | Robinson | Jan. 26, 1909 |
| 2,433,382 | Morrison | Dec. 30, 1947 |
| 2,547,074 | Cirlin | Apr. 3, 1951 |